2,770,636

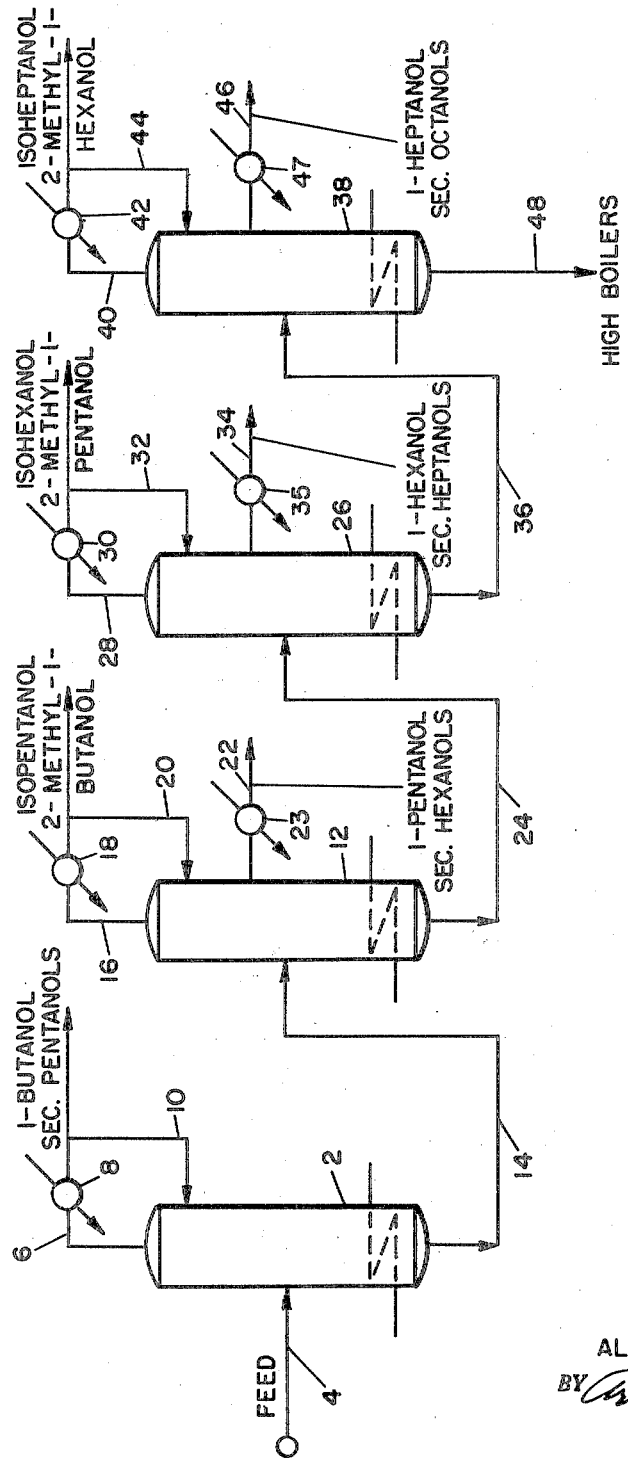

Patented Nov. 13, 1956

2,770,636

METHOD FOR PURIFICATION OF OIL-SOLUBLE ALCOHOLS

Alfred Steitz, Jr., Tulsa, Okla., assignor to Stanolind Oil and Gas Company, Tulsa, Okla., a corporation of Delaware Application October 18, 1952, Serial No. 315,445

9 Claims. (Cl. 260—450)

The present invention relates to the purification of alcohols. More particularly, it is concerned with the recovery of oil-soluble alcohols in purified form from hydrocarbon-containing solutions thereof.

While the process of my invention pertains generally to the removal of hydrocarbons and other objectionable impurities from oil-soluble alcohols, it is particularly applicable to the recovery of alcohols found in a neutralized oil stream produced by the hydrogenation of carbon monoxide in the presence of a fluidized alkali-promoted iron catalyst under known synthesis conditions. The oil product stream obtained in hydrocarbon synthesis contains a rather wide variety of ketones, aldehydes, and alcohols, together with a very substantial proportion of acids, which are generally removed from the oil in a neutralization step. For example, in hydrocarbon synthesis plants designed to produce in the neighborhood of 6,000 barrels of liquid hydrocarbons per day, there are also produced along with the oil fraction approximately 76,000 pounds of carbonyl compounds (aldehydes and ketones), 61,700 pounds of oil-soluble alcohols, and 69,300 pounds of oil-soluble acids per day. Because of their value as chemicals it is desirable to recover these compounds from the oil stream as completely as possible, either as such or in the form of useful derivatives thereof. Also, in the subsequent conversion of the aforesaid oil fraction into gasoline it is imperative that such compounds either be removed from the oil or converted into substances such as, for example, unsaturated hydrocarbons which can then be utilized in conjunction with the hydrocarbons originally synthesized to make high quality motor fuel.

Because of the close proximity in boiling points of these various oil-soluble chemicals to the hydrocarbons constituting the oil fraction, separation of chemicals from hydrocarbons by normal fractional distillation methods is a practical impossibility. Normally, in the recovery of chemicals from the oil stream, the raw primary synthesis oil, as it comes from the separating unit, is treated with sufficient caustic to neutralize the acids present. There result two layers, a neutral oil layer containing the bulk of the nonacid oil-soluble chemicals and a lower aqueous layer containing the acids in the form of their corresponding salts together with an appreciable percentage, i. e., approximately 10 to 15 weight percent of nonacid chemicals which have been solubilized thereby and from about 5 to 8 weight percent of hydrocarbons, depending, of course, on the strength of the caustic initially added. While recovery of the acids from the aforesaid aqueous layer can be accomplished without substantial difficulty, the solubilized chemicals and hydrocarbons present a rather formidable problem, especially where it is desired to effect a substantially complete separation of chemicals from hydrocarbons. Further extraction of the neutral oil layer with soap solutions formerly used, i. e., high molecular weight soaps or solutions of soaps derived from neutralizing the entire acid component of the hydrocarbon synthesis oil, failed to result in satisfactory separation of chemicals from the oil. Thus, in extracting the neutral oil containing nonacid chemicals with such soap solutions, an extract was obtained which, on stripping followed by topping the resulting distillate to about 100° C., did not give a satisfactory separation of hydrocarbons from chemicals. In this procedure, the first distillate secured contained from about 25 to 30 weight percent hydrocarbons, together with essentially all of the nonacid chemicals; and, when such distillate was topped to about 100° C., there was obtained an overhead amounting to about 25 to 30 weight percent of the feed which contained only about 60 weight percent of the hydrocarbons in the feed. While some concentration of hydrocarbons in the light ends was effected, the hydrocarbon content of the fraction boiling above 100° C. (bottoms) was too high to permit recovery of chemicals in a form sufficiently free from hydrocarbons to satisfy average industrial specifications. Moreover, in the distillation of nonacid chemicals from total soap mixtures, foaming frequently becomes so excessive that further separation of the chemicals from the extract is impossible.

Another method for removing alcohols, as well as other chemicals, from hydrocarbon synthesis oil has been developed and is described and claimed in copending application U. S. Serial No. 140,249, filed January 24, 1950, by F. G. Pearce, now U. S. Patent No. 2,645,655. In accordance with the principal embodiment of that process, neutralized synthesis oil is extracted with a soap fraction made up preferably of $C_2$ to $C_6$ acids. The extract thus obtained is then distilled to strip the chemicals and a minimum quantity of hydrocarbons from the soap solution and the bulk of the soap. Thereafter, the distillate which contains the chemicals is fractionated to temperatures of about 100° C., whereby separation between the chemicals and the major portion of the hydrocarbons is effected. In accomplishing the separation, however, 1-propanol together with ketones such as, for example, methyl ethyl ketone and methyl propyl ketone, are taken overhead with hydrocarbons, thereby appreciably lowering the quantity of recoverable chemicals substantially free from hydrocarbons. Normally these chemicals contain less than about 5 weight per cent hydrocarbons. Also, as the strength of the soap solution employed as an extractant aproaches 50 weight percent, the quantity of hydrocarbons remaining in the residue after fractionation up to about 100° C. is found to increase.

Accordingly, it is an object of my invention to provide a procedure for recovering preferentially oil-soluble normal alcohols from solutions thereof with branched chain oil-soluble alcohols, containing contaminating quantities of hydrocarbons and other impurities, wherein such procedure is based upon the discovery that on distillation of said solution, the hydrocarbon contaminants and said impurities tend to concentrate in the fraction predominating in branched chain alcohols, thereby permitting a plurality of fractions of normal alcohols highly purified with respect to hydrocarbons and other contaminants to be recovered. It is a further object of my invention to provide a method for recovering preferentially oil-soluble normal alcohols from solutions thereof with hydrocarbons and oil-soluble branched chain alcohols which may be of the same carbon number as the normal compounds which it is desired to recover in highly purified form. It is a still further object of my invention to provide a process for obtaining in highly purified form normal $C_4$ to $C_8$ alcohols present in mixtures containing branched chain alcohols of similar carbon content as well as objectionable quantities of hydrocarbons and ester contaminants having essentially the same carbon content.

I have now discovered that solutions consisting essentially of preferentially oil-soluble normal alcohols and branched chain alcohols of similar carbon number, together with contaminating amounts of hydrocarbons and other impurities, can be processed in an efficient and relatively simple manner to recover the normal alcohols therefrom in highly purified form. Such a procedure is based upon my observation that on distillation of mixtures of the type involved, the hydrocarbons and other contaminants such as, for example, esters, tend to concentrate in the fractions rich in branched chain alcohols and that the various fractions of normal alcohols can be recovered in relatively pure form.

In accordance with an embodiment of my invention, the oil-soluble nonacid chemicals present in a neutral hydrocarbon synthesis oil stream are recovered therefrom by first subjecting the oil to extraction with a soap solution preferably consisting of aliphatic carboxylic acid salts derived from two to six carbon atoms although total soap solutions, as hereinafter defined, likewise may be used for this purpose. The extract thus obtained is then preferably washed with a light hydrocarbon such as, for example, butane or pentane, to remove the bulk of the hydrocarbons dissolved by the aqueous salt solution. The aqueous raffinate resulting from this operation, generally referred to as "deoiling," is next stripped to effect a seperation of the soap from extracted chemicals, together with from about 10 to about 25 weight percent of hydrocarbons, depending on the strength of the soap solution and on the ratio of the extractant solution to oil employed. The resulting distillate is next subjected to fractional distillation up to a temperature of from about 95° to about 110° C., preferably from about 100° to about 105° C. While the overhead thus obtained contains a substantial portion of hydrocarbon and ester impurities, the residue is found to still contain an objectionable amount of impurities, for example, from about 2 to about 5 percent of hydrocarbons together with similar quantities of esters. This residue is then subjected to reduction, preferably by means of molecular hydrogen in the pressence of a suitable catalyst such as, for example, Raney nickle, at pressures of from about 300 to 1200 p. s. i. and at temperatures of from about 100° to 250° C. The quantity of catalyst may vary, but generally concentrations of from about 1 to about 6 weight percent, based on the carbonyl content of the distaliate, are preferably employed. Completion of hydrogenation is evidenced by failure of a further decrease in system pressure. The usual types of hydrogenation apparatus may be utilized to effect this step such as, for example, pressure autoclaves fitted with suitable agitating devices or reaction vessels of the "rocking bomb" type which are well known to the art. Alternatively the distillate mentioned above, prior to the topping operation at temperatures of from 95° to 110° C., may if desired be subjected to hydrogenation in accordance with the procedure just outlined, followed by topping of the resulting mixture at temperatures coming within the above-mentioned range. Ordinarily the choice of procedure in this regard is determined by the desirability of the recovery of the additional secondary alcohols which will be present in the purified alcohol fractions if hydrogenation precedes the above-mentioned topping operation.

The distillate of chemicals from the soap extract prior to reduction varies in its composition. The majority of such mixtures obtained from hydrocarbon synthesis oil streams, however, usually contains from about 10 to 30 weight percent of carbonyl compounds and from about 70 to 75 weight percent alcohols. After stripping these chemicals from the soap extract and reducing the carbonyl component to the corresponding alcohols, the total alcohol content (normal and branched chain) generally ranges from about 80 to 90 weight percent. The alcohols present in this reduced fraction have an average molecular weight of about 100. In the synthesis oil fractions investigated, the following alcohols have been identified: 1-propanol, secondary butanol, 1-butanol, iso- and n-amyl alcohols, iso- and n-hexyl alcohols, iso- and n-heptyl alcohols, and iso- and n-octyl alcohols, with the $C_4$ and $C_5$ alcohols accounting for about 35 to 40 percent of the total alcohols present.

After reduction, the total alcohol content of the resulting fraction is, as previously indicated, substantially increased with the normal or straight chain alcohols amounting to from about 70 to 80 percent of the alcohols present. The mixture may then be carefully fractionated in an efficient column with 1-butanol and secondary pentanols coming off first at about 70° C. (100 mm. Hg). As the distillation proceeds, the vacuum is increased in order to avoid decomposition of the higher molecular weight alcohols present. The fractionation curve which may be drawn as a result of the distillation of such a mixture of alcohols shows a series of very definite plateaus, each of which represents a fraction of purified straight chain alcohols consisting of a normal primary alcohol, and normal secondary alcohols having one more carbon atom than the normal primary alcohol. The portion of distillate coming off between these plateaus consists essentially of branched chain alcohols and the bulk of the contaminating hydrocarbons and esters. To find that substantially all of the impurities present in mixtures of the above-mentioned type tend to concentrate in the fractions containing the branched chain alcohols is considered surprising and is felt to be even more unexpected when it is realized that the branched chain alcohols normally constitute only from about 20 to about 30 percent of the total mixture of alcohols being fractionated.

Ordinarily the concentration of soap solution used to extract the neutral synthesis oil may vary. However, in general I have found that soap concentrations ranging from about 20 to about 50 weight percent, preferably from 30 to 40 weight percent, are usually most desirable. The composition of the selected soap fraction employed likewise may vary; and for the majority of instances, solvents prepared from soap mixtures derived from mixed acids having an average molecular weight of from about 85 to 115, preferably from about 95 to 105, are generally suitable. The desired fraction of $C_2$ to $C_6$ soaps may be obtained in any conventional manner. For example, the corresponding acid fraction may be secured by first acidifying a soap solution formed by completely neutralizing raw primary synthesis oil to liberate the fatty acids, washing therefrom free mineral acid and salt formed during the acidification step, and thereafter distilling the resulting mixture of washed acids up to a temperature of about 210° C. (760 mm.). The distillate thus obtained may then be neutralized by the addition of a substantially stoichiometric quantity of a suitable base to yield the desired $C_2$ to $C_6$ soap fraction which may then be diluted with water to the required concentration. As examples of bases suitable for use in the formation of these soaps, there may be mentioned ammonium hydroxide, ammonium carbonate, and the various hydroxides and carbonates of the alkali metals, all of which for the purpose of this description are referred to as "alkali metal hydroxides or carbonates."

For a given soap solution, i. e., total soap or a solution of selected soaps, preferably a solution of $C_2$ to $C_6$ soaps, the quantity of hydrocarbons removed from the neutral oil along with the chemicals varies directly with the strength of the soap solution used and also with the ratio of soap to oil employed. Thus, solutions of 20 weight percent soap extract less hydrocarbon with the chemicals than do 50 weight percent soap solutions, but the latter also extract more chemicals than can be obtained with an equivalent volume of 20 weight percent soap. Generally, concentrations of soap up to about 50 weight percent may be employed to extract the neutral oil in ratios of about 2 volumes of soap to 1 of oil.

The expression "total soap," appearing in the present description, is intended to refer to the mixture of soaps prepared by neutralizing the fatty acids present in the raw primary synthesis oil or the equivalent thereof. The term "soap" as used herein is intended to include both the surface-active and nonsurface-active salts derived from fatty acids of the type present in raw primary synthesis oil. The expression "oil-soluble alcohols" used throughout the present description and claims is intended to refer to the $C_4$ and higher alcohols.

An embodiment of the present invention is illustrated by the specific example which follows.

EXAMPLE

A quantity of neutral hydrocarbon synthesis oil was extracted with an approximately equal volume of 40 weight percent aqueous $C_2$ to $C_6$ soap solution wherein the average molecular weight of the aliphatic carboxylic acids from which these soaps were derived was about 105. The resulting extract was stripped until the residue consisted essentially of a concentrated soap solution which was substantially free from chemicals. The distillate thus obtained was then topped in a fractionating column to a temperature of about 100° C. The residue was next treated with hydrogen at 1000 p. s. i., at a temperature of about 100° C., and in the presence of 6 weight percent Raney nickel catalyst. Prior to reduction, the aforesaid residue contained 14.3 weight percent carbonyls, 59.8 weight percent n-alcohols, 19.9 weight percent branched chain alcohols, 3.7 weight percent hydrocarbons, and 2.3 weight percent esters, principally as butyl acetate. Reduction was effected in a rocking bomb type hydrogenation apparatus fitted with a Pyrex glass liner. Hydrogenation was continued until it was indicated that a constant pressure had been reached within the reactor. Thereafter the reduced mixture (96 weight percent of the carbonyls had been reduced) was separated from the catalyst by means of filtration. Thereafter 650 parts of this filtrate was first topped at a temperature of about 104° C. (760 mm.), after which the residue was carefully fractionated over a temperature range of from about 68° to about 132° C. at pressures ranging from about 100 to about 20 mm. Hg. The fractions secured and their quantities and purities thereof obtained are given below.

Table

| Fraction | Percent of Total | Purity, Percent | B. P., °C., 100 mm. |
|---|---|---|---|
| 1-butanol+sec. pentanols | 8.5 | 96.2 | 70.3 |
| isopentanol+2-methyl-1-butanol | 6.2 | 93.0 | 80.5–82.3 |
| 1-pentanol+sec. hexanols | 25.0 | 97.9 | 87.8 |
| isohexanol+2-methyl-1-pentanol | 7.4 | 87.2 | 98.2–99.2 |
| 1-hexanol+sec. heptanols | 19.3 | 98.9 | 103.5 |
| isoheptanol+2-methyl-1-hexanol | 6.2 | 91.4 | 114.4–115.3 |
| 1-heptanol+sec. octanols | 10.0 | 98.3 | 119.5 |
| isooctanol+2-methyl-1-heptanol | 3.1 | 94.0 | 128–129.5 |
| higher boiling alcohols | 14.3 | | |

That a concentration of hydrocarbons occurred in the branched chain alcohol fractions was indicated by the presence of 10.4 weight percent hydrocarbons in the isohexanol fraction. This figure is based on results obtained by means of standard silica gel percolation tests and may be regarded as typical of the hydrocarbon content of the branched chain alcohol fractions obtained in accordance with the process of my invention. On the other hand, the combined hydrocarbon and ester content of the purified straight chain alcohol fractions is generally less than 1 weight percent. The purity of the straight chain alcohol fractions is based on analysis for the hydroxyl group and calculated as n-primary alcohol. Since the secondary alcohols present in these fractions are of higher molecular weight, the purities of the straight chain alcohol fractions listed are necessarily low.

From the foregoing it will be seen that a definite improvement in the purity of the above-mentioned straight chain oil-soluble alcohols can be achieved in accordance with my invention and also that a concentration of the impurities is found to occur in the branched chain oil-soluble alcohol fractions.

An embodiment of my invention involving a continuous process based thereon is illustrated in the accompanying flow diagram in which a stripper distillate of the type herein referred to, previously topped at about 100° C. and catalytically reduced with molecular hydrogen and containing $C_4$ to $C_8$ straight and branched chain alcohols and contaminated with hydrocarbons, esters, etc., is introduced into column 2 through line 4. After a preliminary fraction is taken off overhead at atmospheric pressure and at temperatures of from about 65° to about 103° C., the pressure in column 2 is reduced to about 100 mm. and a fraction withdrawn overhead at 70° C. through line 6 and condenser 8 with a portion thereof returning to the column through line 10 as reflux. From line 6 is recovered a fraction consisting of a mixture of substantially pure 1-butanol and secondary pentanols. The bottoms from column 2 is transferred to column 12 through line 14, which is also operated at 100 mm., and a branched chain alcohol fraction is removed overhead through line 16 and condenser 18, a portion of this stream being returned as reflux through line 20. This fraction which consists chiefly of isopentanol, 2-methyl-1-butanol, hydrocarbons, and esters is taken off overhead at a temperature of about 80° C. Within the column below the point of reflux return, 1-pentanol and secondary hexanols concentrate as a liquid and are withdrawn from the column through line 22 and cooler 23 in the form of a substantially pure mixture of these alcohols. The bottoms resulting from this operation is taken from column 12 through line 24 and introduced into column 26 which is likewise operated at a pressure of about 100 mm. The overhead from this column consists principally of isohexanol, 2-methyl-1-pentanol, hydrocarbons, and esters and is withdrawn therefrom through line 28 and condenser 30, a small reflux stream being returned to the column via line 32. This overhead fraction is removed at a temperature of about 95° C. During this distillation step, a liquid mixture consisting essentially of 1-hexanol and secondary heptanols is withdrawn from the column as a side stream through line 34 and cooler 35. Through line 36 the bottoms portion from column 26 is introduced into column 38 where overhead a mixture of isoheptanol, 2-methyl-1-hexanol, hydrocarbons and esters is taken off through line 40 and condenser 42 at a temperature of about 110° C. at 100 mm. A reflux stream is returned to the column via line 44. Below the point of reflux return, a side stream consisting essentially of 1-heptanol and secondary octanols is withdrawn through line 46 and cooler 47. High-boiling components, including higher molecular weight straight and branched chain alcohols, are withdrawn from the system through line 48 and may be further refined at reduced pressures in accordance with the method generally outlined above.

While a concentration of straight chain alcohols with respect to branched chain alcohols and other impurities may be observed in substantially any level in the distillation zone between the feed plate and the point at which reflux is returned to the column, it is generally preferred to effect withdrawal of straight chain alcohol fractions from a point slightly above the feed plate, for example, 3 to 5 plates above the latter.

From the foregoing description it will be apparent that the process of the present invention is capable of effectively handling hydrocarbon-containing oil-soluble alcohol mixtures of widely varying composition. It will also be obvious that numerous modifications in manipulative steps may be made in my process without departing from the scope thereof. Thus, it will be appreciated that the principles taught herein are readily applicable to the recovery and purification of oil-soluble alcohols found in hydrocarbon-contaminated feed mixtures other than those specifically mentioned herein. Also, it will be apparent that my invention contemplates complete reduction of the carbonyl compounds present in the aforesaid stripper distillate prior to topping said distillate at a temperature of from about 95° to about 110° C.

I claim:

1. In a batch process for the recovery and purification of preferentially oil-soluble straight chain alcohols present in a mixture consisting essentially of said straight chain alcohols and branched chain alcohols of corresponding carbon content together with objectionable concentrations of hydrocarbon contaminants wherein said mixture is obtained by first extracting hydrocarbon synthesis oil with an aqueous solution of a substantially nonsurface-active salt of a preferentially oil-soluble carboxylic acid to obtain an extract contaminated with objectionable amounts of hydrocarbons, thereafter subjecting the resulting extract to distillation to obtain a distillate containing oil-soluble carbonyl compounds and alcohols, said distillate being free from said salt solution but containing hydrocarbon contaminants, and topping said distillate to a temperature of from about 95° to about 110° C. whereby an appreciable quantity of said hydrocarbons is removed overhead together with some alcohols and carbonyls, the steps which comprise subjecting the resulting residue, which still contains an objectionable concentration of hydrocarbons, to reducing conditions whereby the carbonyl compounds present therein are substantially completely converted to their corresponding alcohols, introducing the resulting reduced residue into the distillation zone of a column under fractional distillation conditions of elevated temperature and reduced pressure and separately collecting as distillate alternate fractions of highly purified straight chain alcohols and of branched alcohols containing hydrocarbons in concentrations substantially greater than the concentration of said hydrocarbons present in said mixture.

2. The process of claim 1 in which the topping operation is effected at a temperature of from about 100° to about 105° C., the residue resulting from said topping operation is subjected to catalytic hydrogenation with molecular hydrogen, and the alcohols formed by said hydrogenation step consist essentially of straight and branched chain alcohols having from 4 to 8 carbon atoms.

3. The process of claim 2 in which the aqueous solution of non-surface-active salts is prepared from salts of carboxylic acids having an average molecular weight of from about 95 to about 105.

4. In a continuous process for the recovery and purification of preferentially oil-soluble straight chain alcohols present in a mixture consisting essentially of said straight chain alcohols and of branched chain alcohols of corresponding carbon content together with objectionable concentrations of hydrocarbon and ester contaminants, the steps which comprise introducing said mixture into a distillation zone of a column under fractional distillation conditions, collecting an overhead comprising essentially said contaminants and a branched chain alcohol; returning a portion of said overhead to said zone as reflux, withdrawing a side stream consisting essentially of straight chain alcohols from an intermediate point in said zone above the point at which said mixture was introduced and below the level at which said reflux is returned to said zone, withdrawing the bottoms resulting from the above-described distillation step, introducing into a second distillation zone under distillation conditions of elevated temperature and reduced pressure said bottoms comprising contaminating hydrocarbons and other impurities and higher molecular weight straight chain and branched chain alcohols than were recovered in the previous distillation step, and repeating the above cycle.

5. The process of claim 4 in which the mixture of alcohols introduced into the first-mentioned distillation zone consists essentially of straight and branched chain alcohols having from 4 to 8 carbon atoms, and wherein said contaminants are each present in a concentration of from about 2 to 5 weight percent.

6. The process of claim 4 in which a side stream consisting essentially of straight chain alcohols is withdrawn at a point slightly above the level at which said mixture was introduced.

7. In a batch process for the recovery and purification of preferentially oil-soluble straight chain alcohols present in a mixture consisting essentially of said straight chain alcohols and of branched chain alcohols of corresponding carbon content together with objectionable concentrations of hydrocarbon contaminants wherein said mixture is obtained by first extracting hydrocarbon synthesis oil with an aqueous solution of substantially nonsurface-active salts of preferentially oil-soluble carboxylic acids to obtain an extract contaminated with objectionable amounts of hydrocarbons, thereafter subjecting the resulting extract to distillation to obtain a distillate containing oil-soluble carbonyl compounds and alcohols, said distillate being free from said salt solution but containing hydrocarbon contaminants, the steps which comprise subjecting said distillate to reducing conditions whereby the carbonyl compounds present therein are substantially completely converted to their corresponding alcohols, topping the resulting reduced distillate to a temperature of from about 95° to about 110° C. whereby an appreciable quantity of said hydrocarbons is removed overhead, introducing the resulting residue into the distillation zone of a column under fractional distillation conditions of elevated temperature and reduced pressure and separately collecting as distillate alternate fractions of highly purified straight chain alcohols and of branched chain alcohols containing hydrocarbons in concentrations substantially greater than the concentration of said hydrocarbons present in said mixture.

8. In a batch process for the recovery and purification of preferentially oil-soluble straight chain alcohols present in a mixture consisting essentially of said straight chain alcohols and branched chain alcohols of corresponding carbon content together with objectionable concentrations of hydrocarbon and carbonyl contaminants, the steps which comprise reducing said carbonyl contaminants to their corresponding alcohols, thereafter introducing the resulting reduced mixture into the distillation zone of a column under fractional distillation conditions of elevated temperature and reduced pressure and separately collecting as distillate alternate fractions of highly purified straight chain alcohols and of branched alcohols containing hydrocarbons in concentrations substantially greater than the concentration of said hydrocarbons present in said mixture.

9. The process of claim 8 in which the straight and branched chain alcohols present in said mixture contain from 4 to 8 carbon atoms, the temperature employed during the distillation step ranges from about 68° to about 132° C. and the pressure maintained within the distillation zone ranges from about 20 to about 100 mm.

References Cited in the file of this patent

UNITED STATES PATENTS

| | | |
|---|---|---|
| 2,551,584 | Carlson et al. | May 8, 1951 |
| 2,588,272 | Morrell et al. | Mar. 4, 1952 |
| 2,614,128 | Mertzweiller | Oct. 14, 1952 |
| 2,645,655 | Pearce | July 14, 1953 |
| 2,675,401 | Laemmle | Apr. 13, 1954 |